United States Patent
Wang

(10) Patent No.: US 10,600,186 B2
(45) Date of Patent: Mar. 24, 2020

(54) PERFORMING SEGMENTATION OF CELLS AND NUCLEI IN MULTI-CHANNEL IMAGES

(71) Applicant: Ventana Medical Systems, Inc., Tucson, AZ (US)

(72) Inventor: Xiuzhong Wang, San Jose, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 110 days.

(21) Appl. No.: 15/957,613

(22) Filed: Apr. 19, 2018

(65) Prior Publication Data

US 2018/0240239 A1 Aug. 23, 2018

Related U.S. Application Data

(63) Continuation of application No. PCT/EP2016/074827, filed on Oct. 17, 2016.

(60) Provisional application No. 62/243,536, filed on Oct. 19, 2015.

(51) Int. Cl.
*G06T 7/11* (2017.01)
*G06T 7/194* (2017.01)
*G06T 7/10* (2017.01)

(52) U.S. Cl.
CPC .............. *G06T 7/11* (2017.01); *G06T 7/10* (2017.01); *G06T 7/194* (2017.01); *G06T 2207/10016* (2013.01); *G06T 2207/10024* (2013.01); *G06T 2207/10152* (2013.01); *G06T 2207/20041* (2013.01); *G06T 2207/30024* (2013.01)

(58) Field of Classification Search
CPC ... G06T 7/11; G06T 7/194; G06T 7/10; G06T 2207/10016; G06T 2207/10024; G06T 2207/10152; G06T 2207/20041; G06T 2207/30024

USPC ........................................................ 382/173
See application file for complete search history.

(56) References Cited

U.S. PATENT DOCUMENTS

2018/0103892 A1* 4/2018 Kaur ..................... A61B 5/444
2018/0365808 A1* 12/2018 Jiang ..................... G06T 5/009

OTHER PUBLICATIONS

Ablameyko S. et al, Using Distance Information for Editing Binary Pictures, The 6th Scandinavian Conference on Image Analysis, (1989), pp. 401-407, Section 2.1.

(Continued)

*Primary Examiner* — Jonathan S Lee
(74) *Attorney, Agent, or Firm* — Kilpatrick Townsend & Stockton LLP

(57) ABSTRACT

Systems and methods of improving segmentation and classification in multi-channel images of biological specimens are described herein. Image channels may be arranged and processed sequentially, with the first image channel being processed from an unmodified image, and subsequent images processed from attenuated images that remove features of previous segmentations. For each segmented image channel in sequence, a binary image mask of the image channel may be created. A distance transform image may be computed from the binary mask. Attenuation images computed for all previous channels may be combined with a current attenuation image to create a combined attenuation image. The next image channel in the sequence may then be attenuated to produce an attenuated next image channel, which may then be segmented. The steps can be repeated until all image channels have been segmented.

12 Claims, 11 Drawing Sheets

(56) References Cited

OTHER PUBLICATIONS

Cheng E. D. et al, Microscopic Cell Segmentation and Dead Cell Detection Based on CFSE and PI Images by Using Distance and Watershed Transforms, IEEE, (2009), pp. 32-39.
International Search Report and Written Opinion dated Dec. 15, 2016 in corresponding PCT/EP2016/074827 filed Oct. 17, 2016, pp. 1-12.
Russ J. C., Processing Binary Images, The Image Processing Handbook, (2011), pp. 443-509,, Chapter 8, Taylor & Francis Group, LLC.
Yan, P. et al, Automatic Segmentation of High-Throughput RNAi Fluorescent Cellular Images, IEEE, (2008), pp. 109-117, vol. 12, No. 1.

\* cited by examiner

PERFORMING SEGMENTATION OF CELLS AND NUCLEI IN MULTI-CHANNEL IMAGES

CROSS-REFERENCE TO RELATED APPLICATIONS

This patent application is a continuation of International Patent Application No. PCT/EP2016/074827 filed Oct. 17, 2016, which claims priority to and the benefit of U.S. Provisional Application No. 62/243,536, filed Oct. 19, 2015. Each of the above patent applications is incorporated herein by reference as if set forth in its entirety.

FIELD OF THE SUBJECT DISCLOSURE

The field of the invention relates to image processing and image analysis in digital pathology applications.

BACKGROUND OF THE SUBJECT DISCLOSURE

In digital pathology (DP) applications, it is very often that the objects of interest (nuclei, cells, fluorescent in-situ hybridization (FISH) dots, Quantum dots, etc.) have to be segmented in multiple channel (or component) images, either obtained directly under different optical spectrum or indirectly from one or multiple color images obtained under different spectrum distribution from the same tissue section or consecutive tissue sections. The segmentation is carried out on the channels one after another and the final segmentation result(s) is (are) the aggregation of the results from all or a subset of these images. Often times, the same object can have footprints in more than one of these images and the desired outcome sometimes is to eliminate the repetition of the objects although true overlap of different objects is possible. A widely used conventional solution is to set the intensity values inside objects that have already been obtained in one or more processed channels to a fixed low value in the subsequent images, based on biological grounds or other considerations. This approach creates steep "holes," which means unnatural transitions between foreground and background. It leads to distorted image features being used for further image analysis or classification. In the worst case, it can even create artificial islands where nuclei from processed images form a closed loop, which leads to an identification of artificial objects that may be difficult to discriminate.

SUMMARY OF THE SUBJECT DISCLOSURE

The present disclosure provides a method that overcomes the repetition of nucleus/cell segmentation in multiple channel (registered) images while creating a minimally altered foreground for nucleus/cell segmentation and classification, and minimizing the side effects on neighboring nuclei/cells in subsequent channel images and the chance of creating artificial nuclei/cells, as specified in the independent claims.

In one embodiment, a method of performing segmentation on multi-channel images of a biological specimen is provided, the method being implemented, for example, in the form of executable instructions stored on a non-transitory computer-readable medium, where the instructions, when executed by a processor, cause the processor to perform the following operations:
segmenting a first image channel, wherein the segmentation creates segmented regions of the image;
creating a first binary image mask of the first image channel based on the segmentation result from the first channel, wherein, for example, the binary image mask is 1 inside the segmented regions and 0 everywhere else;
computing a first distance transform image, wherein each pixel in the distance transform image that is inside a segmented region indicates a distance to the nearest edge of the segmented region, and all pixels outside are, for example, 0;
computing a first attenuation image, where the attenuation image is a function (e.g., a polynomial function) of the distance transform image, applied to each pixel;
attenuating a second image channel by dividing the second image channel by the attenuation image, resulting in an attenuated second image channel; and
segmenting the attenuated second image channel.

In another embodiment, another method of performing segmentation on multi-channel images of a biological specimen is provided. The method may be performed on a plurality of image channels that are sequentially arranged. The method may be implemented, for example, in the form of executable instructions stored on a non-transitory computer-readable medium, where the instructions, when executed by a processor, cause the processor to perform the following operations:
segmenting a first image channel, wherein the segmentation creates segmented regions of the image; and
for each segmented image channel in sequence, performing the following steps:
creating a binary image mask for the image channel;
computing a distance transform image from the binary mask, wherein each pixel in the distance transform image that is inside a segmented region indicates a distance to the nearest edge of the segmented region, and all pixels outside are, for example, 0;
computing an attenuation image, where the attenuation image is a function (e.g., a polynomial function) of the distance transform image applied to each pixel;
combining the attenuation images from all previous channels with the attenuation image of a current channel to create a combined attenuation image;
attenuating the next image channel by dividing it by the combined attenuation image, resulting in an attenuated next image channel; and
segmenting the attenuated next image channel and repeating the previous steps for the segmented attenuated next image channel until all image-channels have been segmented and attenuated.

In yet another embodiment, a system for quality control of segmentation performed on multi-channel images of a biological specimen is provided. The system may include:
a processor; and
a memory coupled to the processor, the memory stores instructions readable by a computing device that, when executed by the processor, cause the processor to perform operations comprising:
segmenting a first image channel, wherein the segmentation creates segmented regions of the image;
creating a first binary image mask of the first image channel based on the segmentation result from the first channel, wherein, for example, the binary image mask is 1 inside the segmented regions and 0 everywhere else;
computing a first distance transform image, wherein each pixel in the distance transform image that is inside a segmented region indicates a distance to the nearest edge of the segmented region, and all pixels outside are, for example, 0;

computing a first attenuation image, where the attenuation image is a function (e.g., a polynomial function) of the distance transform image, applied to each pixel;

attenuating a second image channel by dividing the second image channel by the attenuation image, resulting in an attenuated second image channel; and segmenting the attenuated second image channel.

In a further embodiment, another system for quality control of segmentation performed on multi-channel images of a biological specimen is provided. The system may include:

a processor; and a memory coupled to the processor, the memory stores instructions readable by a computing device that, when executed by the processor, cause the processor to perform operations comprising:

segmenting a first image channel, wherein the segmentation creates segmented regions of the image, for each segmented image channel in sequence, performing the following steps:

creating a binary image mask for the image channel;

computing a distance transform image from the binary mask, wherein each pixel in the distance transform image that is inside a segmented region indicates a distance to the nearest edge of the segmented region, and all pixels outside are, for example, 0;

computing an attenuation image, where the attenuation image is a function (e.g., a polynomial function) of the distance transform image applied to each pixel;

combining the attenuation images from all previous channels with the attenuation image of a current channel to create a combined attenuation image;

attenuating the next image channel by dividing it by the combined attenuation image, resulting in an attenuated next image channel; and segmenting the attenuated next image channel.

According to another embodiment, a tangible, non-transitory storage medium to store digitally encoded instructions executable by a processor is provided. The digitally encoded instructions may include instructions for performing segmentation on multi-channel images of a biological specimen, wherein the instructions, when executed, may cause the processor to perform operations comprising:

segmenting a first image channel, wherein the segmentation creates segmented regions of the image;

creating a first binary image mask of the first image channel based on the segmentation result from the first channel, wherein, for example, the binary image mask is 1 inside the segmented regions and 0 everywhere else;

computing a first distance transform image, wherein each pixel in the distance transform image that is inside a segmented region indicates a distance to the nearest edge of the segmented region, and all pixels outside are, for example, 0;

computing a first attenuation image, where the attenuation image is a polynomial function of the distance transform image, applied to each pixel;

attenuating a second image channel by dividing the second image channel by the attenuation image, resulting in an attenuated second image channel; and segmenting the attenuated second image channel.

In a further embodiment, a non-transitory storage medium to store digitally encoded instructions executable by a processor is provided. The digitally encoded instructions may include instructions for performing segmentation on multi-channel images of a biological specimen, where the instructions, when executed, cause the processor to perform operations comprising:

segmenting a first image channel, wherein the segmentation creates segmented regions of the image;

for each segmented image channel in sequence, performing the following steps:

creating a binary image mask for the image channel;

computing a distance transform image from the binary mask, wherein each pixel in the distance transform image that is inside a segmented region indicates a distance to the nearest edge of the segmented region, and all pixels outside are, for example, 0;

computing an attenuation image, where the attenuation image is a function (e.g., a polynomial function) of the distance transform image applied to each pixel;

combining the attenuation images from all previous channels with the attenuation image of a current channel to create a combined attenuation image;

attenuating the next image channel by dividing it by the combined attenuation image, resulting in an attenuated next image channel; and segmenting the attenuated next image channel.

In some embodiments, each segmented region of the binary image mask is dilated by a configurable number of pixels before computing the distance transform and the attenuation image.

One advantage of the methods and systems discussed herein is that the use of a smoothly varying attenuation weighting mask, progressively constructed and applied to each subsequent image of a stack, may produce a modified image that exhibits fewer segmentation artifacts. The reduction in number of artifacts may also suppress the formation of spurious regions and diminish double counting of regions. An attenuation weighting mask may be progressively derived from Chamfer distance transforms of each image, with respect to segmentation boundaries. Images may be processed in declining order of importance so that artifacts which might arise in later images may be suppressed more by the progressive attenuation mask, and may contribute less to the modified image.

In most applications, the priorities of the channel images can be determined based on domain knowledge. The channel images can be segmented sequentially in the descending order of their priorities. After segmenting each channel image, a suppressing mask $B_i$ of the channel is initialized using the nucleus mask. Then distance transform is applied on the suppressing mask. Next, the distance transform image $D_i$ is transformed using a polynomial with the constant term of 1 to create the attenuation image $P_i$, which is designed to achieve heavier attenuation toward the center of nuclei/cells segmented. When processing a subsequent channel image $I_s$, if it is necessary to remove repetition of segmentation from a previous channel $I_r$, we can create a modified image $\hat{I}_s$ by dividing $I_s$ by the $P_r$. Nucleus/cell segmentation is applied on $\hat{I}_s$ to create the nucleus/cell label image and nucleus/cell mask for this channel image, and features of those objects are extracted based on $\hat{I}_s$ for classification.

In case it is necessary to remove repetition from multiple channels, the attenuation images of those channels can be easily combined into one attenuation image. The modified image $\hat{I}_s$ can be then obtained by dividing $I_s$ by the combined attenuation image. Note that the suppressing mask can be dilated before distance transform according to the characteristics of the image and the segmentation method and the polynomial can be tuned to achieve a desired transition between the neighboring nuclei/cells at different channel images. The major improvements are: (1) the attenuated channel image has natural transitions between attenuated regions and un-attenuated regions, which means reduced artifacts for further image analysis, compared with the conventional approach; (2) the attenuated channel image enables accurate features for nucleus/cell classification; (3) the attenuation image can be designed based on the physics of image formation of the channel images to achieve desired transition between background and foreground, which can further be utilized for more effective image analysis.

Said features may be advantageous in offering a sound approach to reduce the chance of creating artificial nuclei/cells and affecting neighboring nuclei from subsequent channels while avoiding repetition of segmenting the same nucleus/cell in multiple channel images. The method creates a much clean image for further processing than the conventional approach commonly used.

DETAILED DESCRIPTION OF THE SUBJECT DISCLOSURE

Figure 1A:
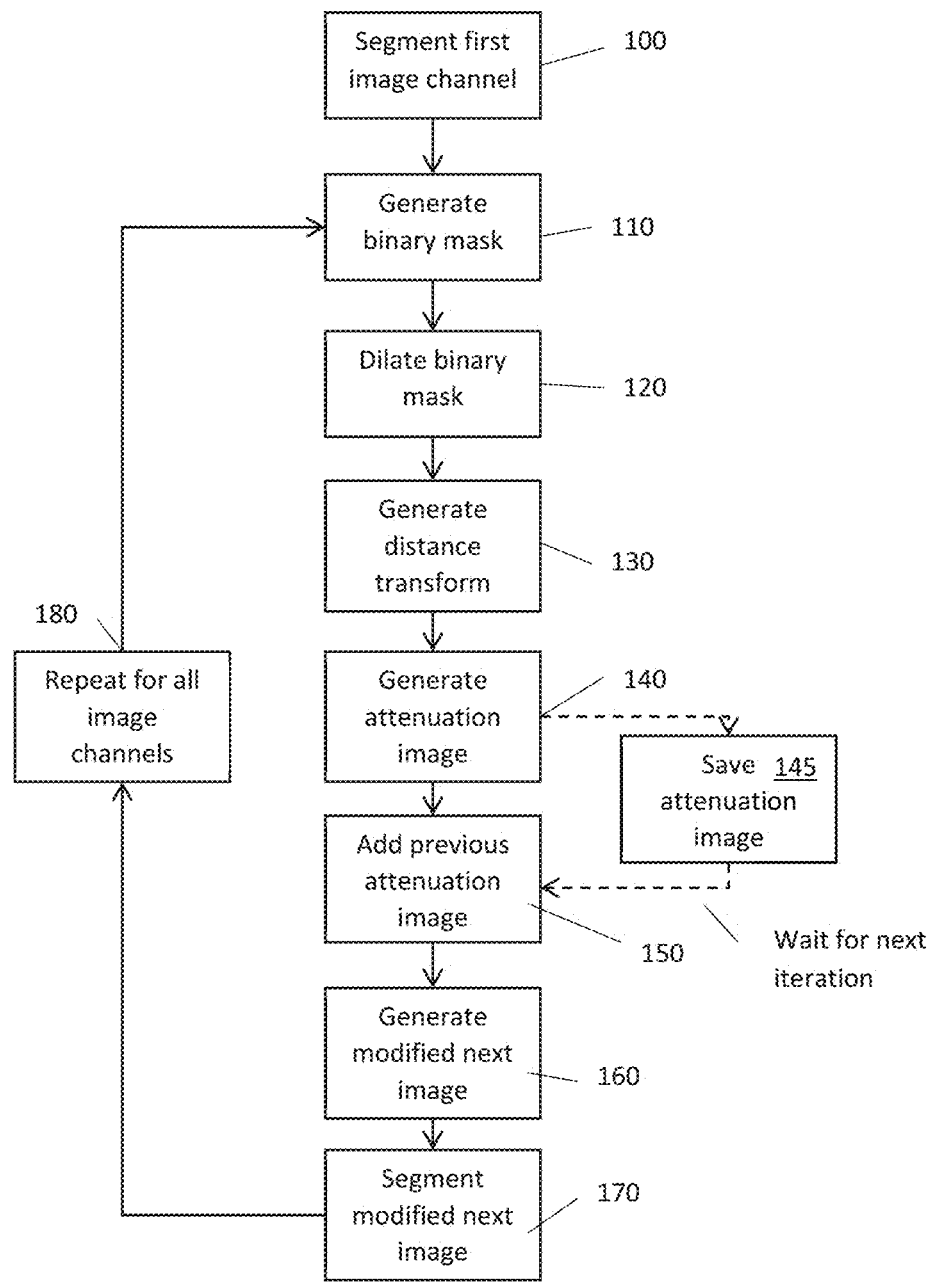
FIG. 1A shows an exemplary process flowchart of a method according to an embodiment of the present disclosure.
Figure 1B:
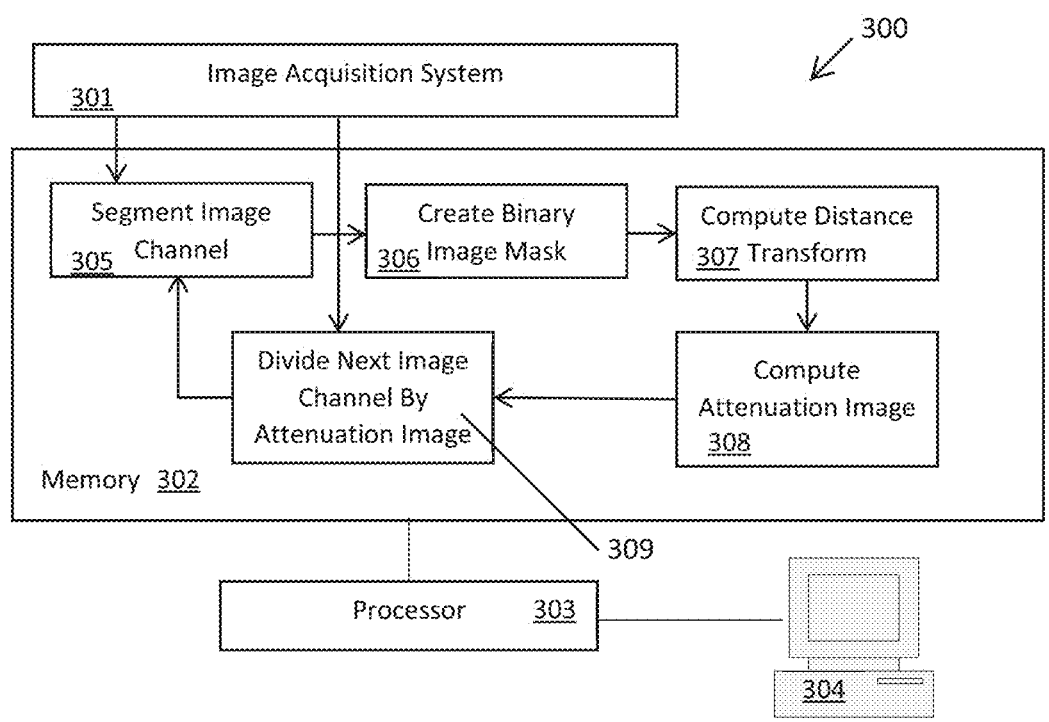
FIG. 1B shows a schematic diagram of one embodiment.

According to one embodiment, a method of improving segmentation and classification in multi-channel images is provided. The image channels are arranged and processed sequentially, with the first image channel being processed from an unmodified/original image, and subsequent images processed from attenuated images that remove features of previous segmentations, as shown in FIG. 1A and FIG. 1B. A first image channel image (201) is segmented (100), which creates segmented regions of the image. For each segmented image channel in sequence (180), a binary image mask (202) of the image channel (110) is created, and the part of the segmented image to be masked out of the multi-channel image is set to a maximum value (shown as white) and the part of the image not masked is set to a minimum value (black). The binary image mask is dilated (120), which increases the size of each masked area by a small number of pixels, to generate a dilated binary image mask (202). Dilation of the binary image mask allows for tuning transitions across the edges of the edges of the segmented region in subsequent image segmentations. A distance transform image is computed from the binary mask (130) to produce a distance transform image (203). Each pixel in the distance transform image that is inside a masked region of the binary image mask indicates a distance to the nearest edge of the masked region, and all pixels outside are 0. An attenuation image (140) is then computed, where the attenuation image (204) is a polynomial function of the distance transform image applied to each pixel. The next image channel image (205) is then divided by the attenuation image (160) to produce a modified image channel image (206), upon which the next segmentation step is performed.

When subsequent image channel images are processed, the attenuation images for all previous channels (145) are then combined with that of the current channel (150), if we want to avoid segmentation repetition with these channels for the next channel image, to create a combined attenuation image (150). The next image channel (160) in the sequence is then attenuated by dividing it by the combined attenuation image, resulting in an attenuated next image channel. The attenuated next image channel (170) is then segmented. This process is then repeated until all image channels have been segmented.

In some embodiments, the segmentations from the multiple image channels can then be combined and overlaid on the original multi-channel image(s).

The proposed method aims to provide efficient ways to modify the subsequent channel images so that the transitions between the background and foreground is natural on appearance, which means minimally distorted features, and possesses favorable properties that further image analysis can use to reduce analysis artifacts. Let the original images of the n channels be $I_1, I_2, \ldots, I_n$, which are prioritized from 1 to n in a descending order. As each channel is segmented, a binary image mask is generated. The binary image mask identifies the segmented areas of the image channel image and is used to remove these areas from subsequent channel processing. The binary mask is created by setting the value of the mask image to a maximum inside the segmented region and to a minimum outside (see FIG. 4). The binary mask may then optionally be dilated (the white regions enlarged) by a few pixels to ensure that the edges of the segmented regions are completely covered. Let the binary mask of the segmentation results from the images be $B_1, B_2, \ldots, B_n$. Let the distance transform of the mask images be $D_1, D_2, \ldots, D_n$. The segmentation on channel image L is carried out on L directly, while subsequently channels images are carried out on the modified version of the original images, aiming to exclude the areas corresponding to the segmentation results from previous channel images when proper. For example, if it is desired to segment channel $I_s$ excluding the nucleus/cell/dot area in channel $I_r$, then we need to create $\hat{I}_s$ a modified version of $I_s$, based on channel image $I_s$ and distance transform $D_r$ for segmentation.

Figure 10:
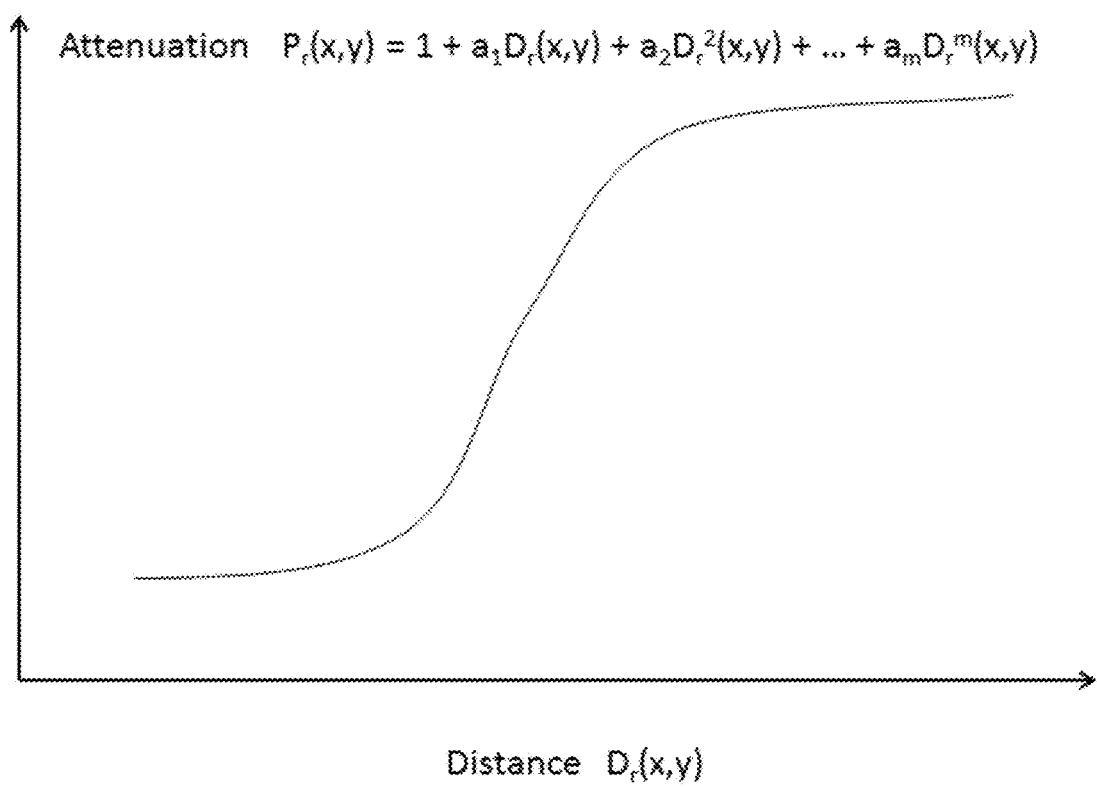
FIG. 10 shows an example polynomial function used to generate the attenuation image.

Based on the distance transform image $D_r$, whose value at each pixel is the shortest distance of the pixel to the background, an attenuation image $P_r(204)$ is created by applying an $m^{th}$-order polynomial transform to the distance transform, i.e., $$P_r(x,y)=1+a_1 D_r(x,y)+a_2 D_r^2(x,y)+ \ldots +a_r D_r^m(x,y)$$

where x and y are pixel indices, $a_1 \ldots a_m$ are coefficients of the polynomial, and $D_r(x,y)$ is the value of the distance transform at pixel (x,y). An example attenuation polynomial is shown in FIG. 10. By dilating the binary mask (120) before performing the distance transform (130), the attenuation image (204) has a desired transition over the edge of the segmented region in the original image. This removes edge artifacts of the segmentation. The modified image channel image $\hat{I}_s$ (206) is then created as the division of the original image channel image $I_s$ (205) by the attenuation image $P_r$ (204) i.e., $$\hat{I}_s(x,y) = I_s(x,y)/P_r(x,y)$$

where x and y are pixel indices, $I_s(x,y)$ is the value of the original channel image at pixel (x,y), $P_r(x,y)$ is the value of the attenuation image at pixel (x,y), and $\hat{I}_s(x,y)$ is the value of the modified channel image at pixel (x,y). The choice of the order of the polynomial, m, depends on the features of the image (i.e. characteristics of the edge slope) and the desired properties of the modified image (i.e. smoothness of final image output).

The intensity of the attenuation image P is an indicator of the strength, i.e. a higher the intensity indicates more attenuation. In some embodiments, m may range from 1-5. In general, m=2, corresponding to a parabolic shape, is a good choice since the characteristics around object edges in most images is second order). In some cases, the edge characteristics has an order higher than 2. For instance, it may be preferable to have a steeper hole for segmented area, a larger m should be used. A steeper hole is not necessarily needed for dense features (i.e. many objects clustering together. Steeper holes may be sometimes desired if they can benefit further processing procedures.

Considering segmentation accuracy on the border area (or other reasons), the binary mask could be dilated for a few pixels before distance transform to reduce possible artifacts around nucleus/cell/dot border pixels. In case it is necessary to avoid overlapping artifacts from multiple channel images $I_{r1}, I_{r2}, \ldots, I_{rp}$ for channels, it is straightforward to combine the multiple attenuation images into one, i.e., $$P_{r1-p}(x,y) = \max(P_{r1}(x,y), P_{r2}(x,y), \ldots, P_{rp}(x,y))$$

EXAMPLE 1

Figure 2:
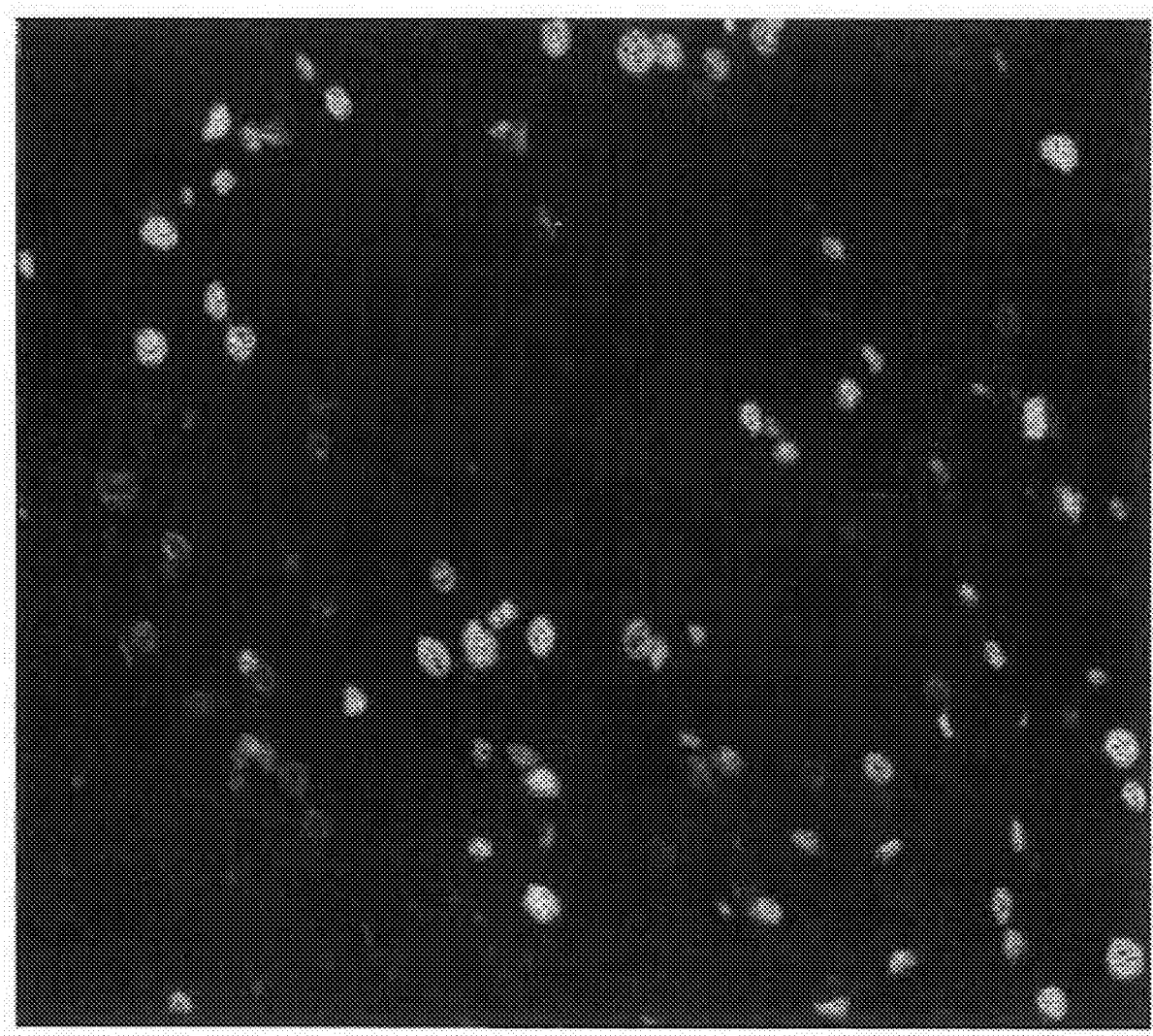
FIG. 2 shows an example of a Channel 1 image $I_1$.
Figure 3:
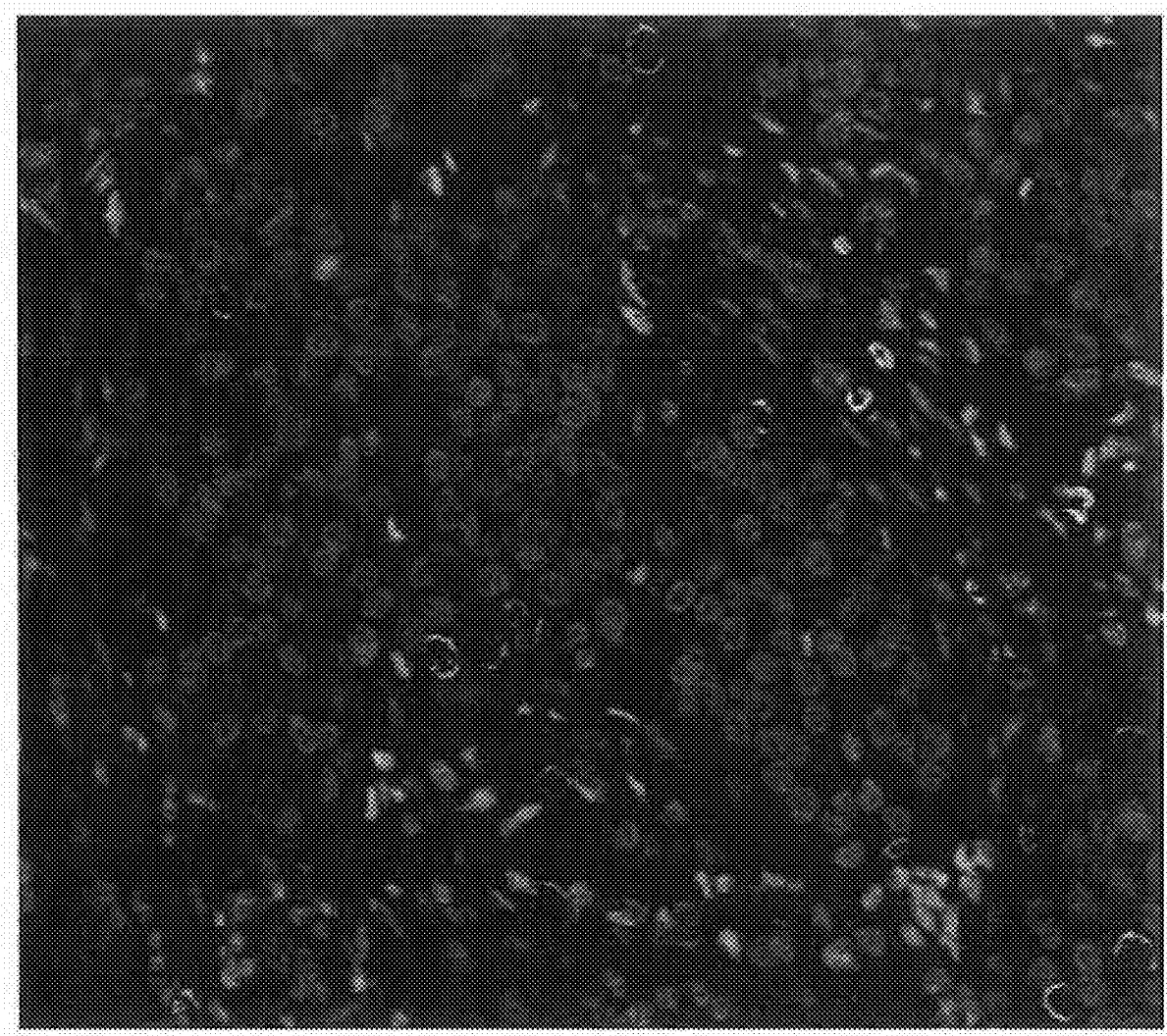
FIG. 3 shows an example of a Channel 2 image $I_2$.
Figure 4:
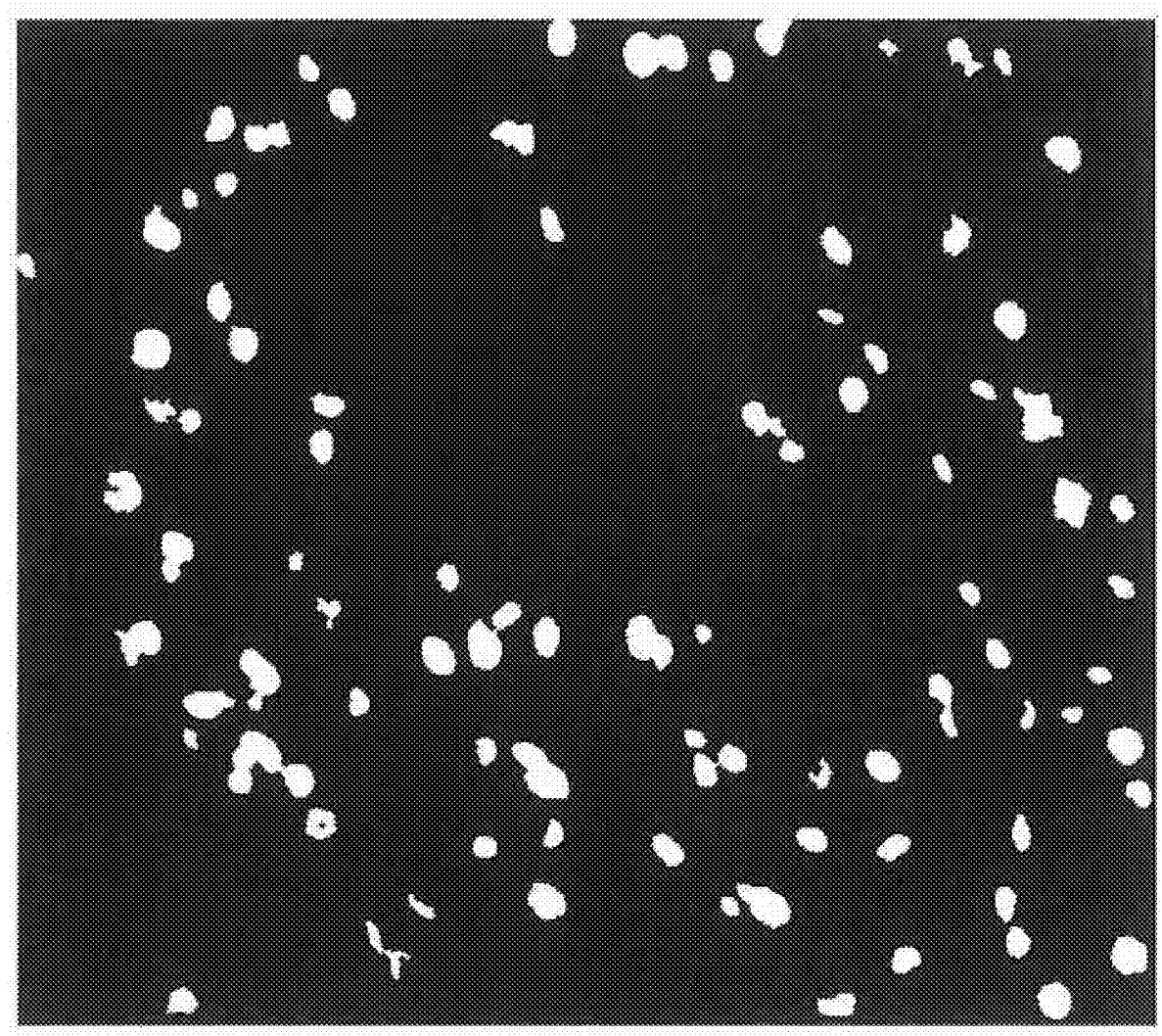
FIG. 4 shows an example of a Binary mask image $B_1$.

The input image set comprises a two-channel image. The two channels correspond to $I_1$ and $I_2$ as shown in FIG. 2 and FIG. 3. Image $I_1$ (201) is segmented (100) and a binary image mask (202) is generated (110) and subsequently dilated (120) to cover the possible edge artifacts of the segmented regions. The binary image mask of nuclei segmented from $I_1$, is shown in FIG. 4.

Figure 5:
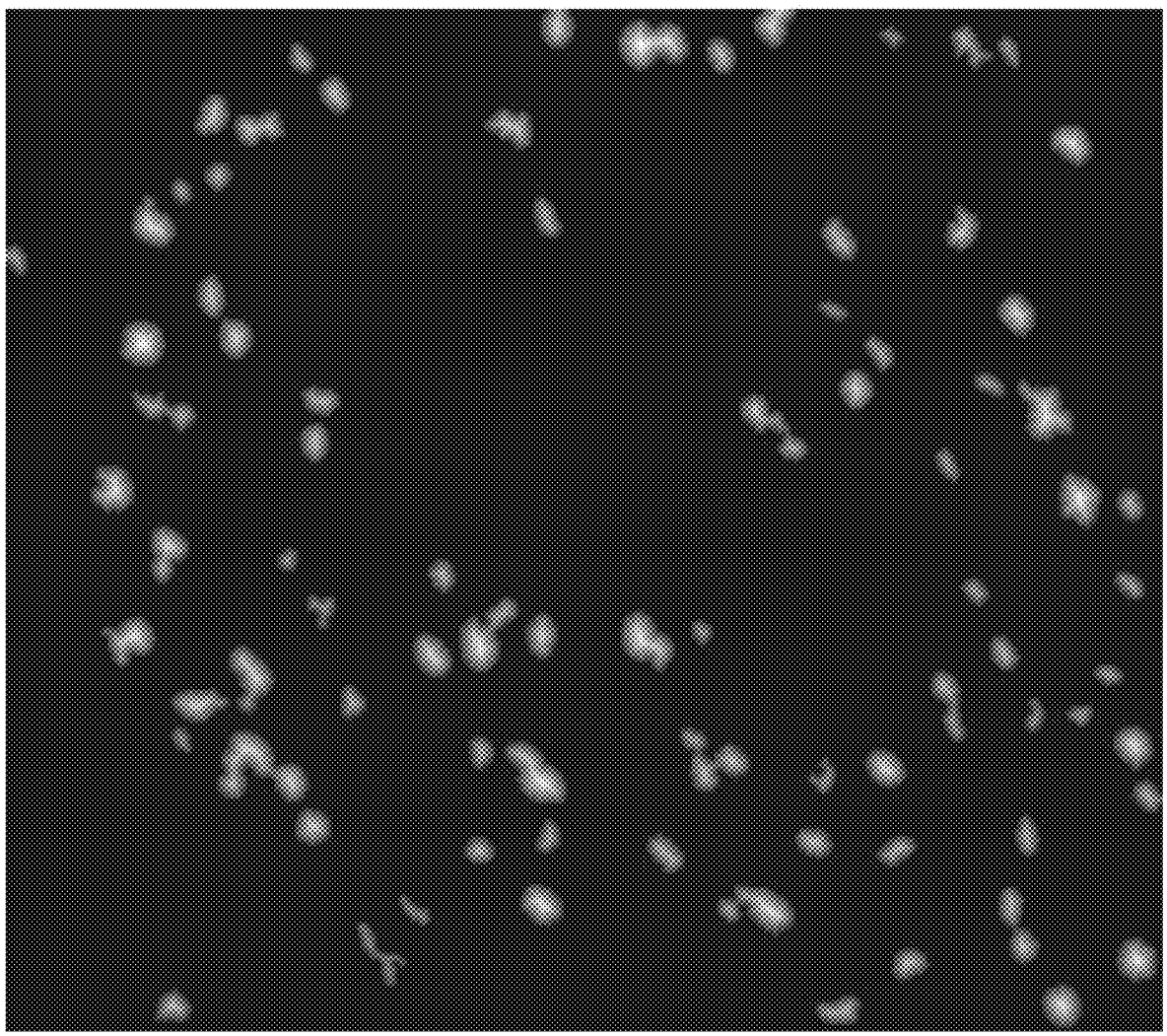
FIG. 5 shows an example of a distance transform $D_1$.

The dilated binary image mask (202) is then used to generate a distance transform image (203), by computing the distance to the edge of the masked (white) region for each pixel in the image (distance is zero outside the masked region)(130). The distance transform of the binary image mask is shown in FIG. 5.

Figure 6:
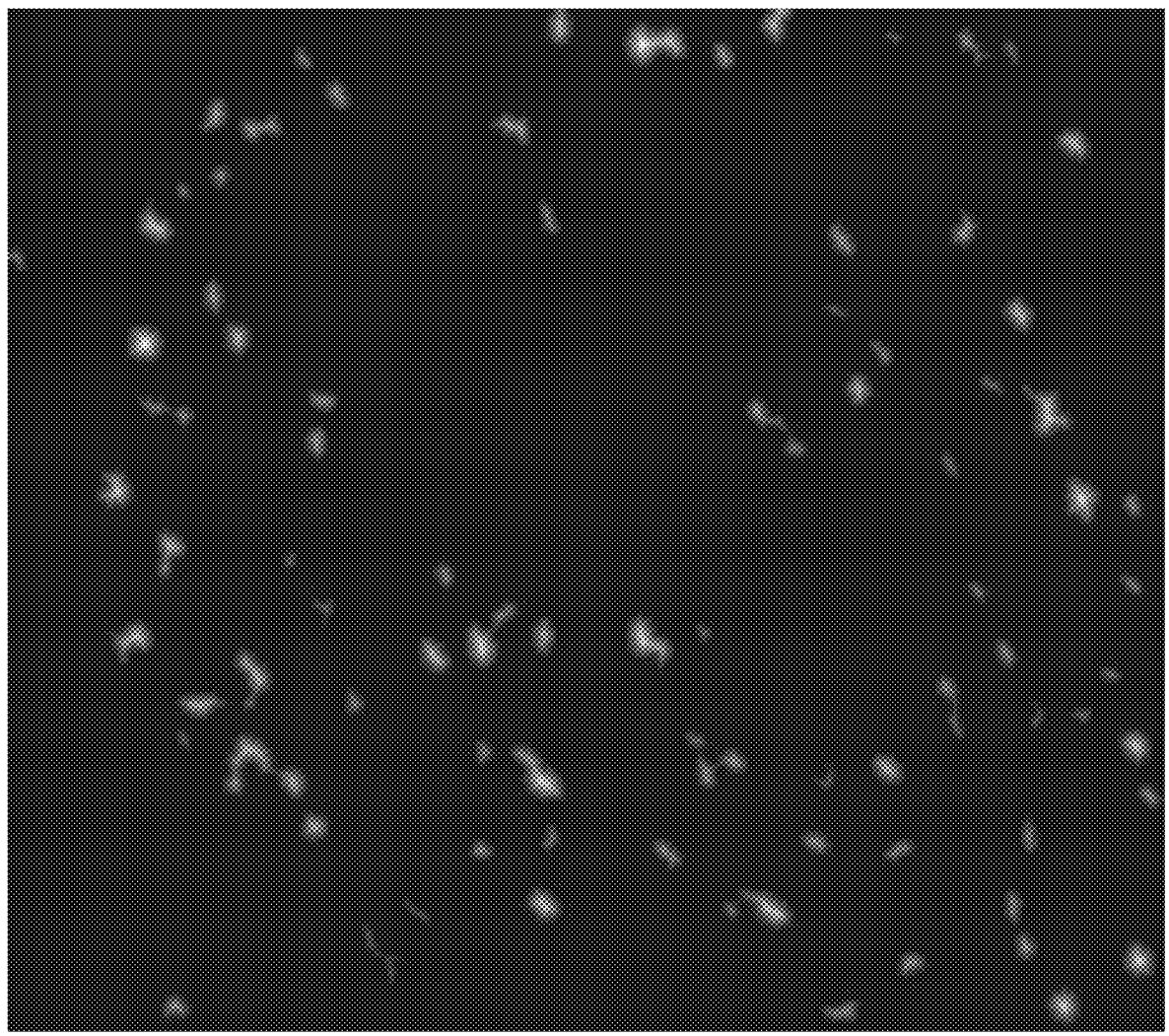
FIG. 6 shows an example of an attenuation image $P_1$.

The distance transform image (203) is then used to generate an attenuation image (204) by performing a polynomial transform (140) on each pixel of the distance transform image. The attenuation image is shown in FIG. 6. The polynomial transform in this example is a second-order polynomial parabola (m=2, $a_1$=0, $a_2$=2).

Figure 7:
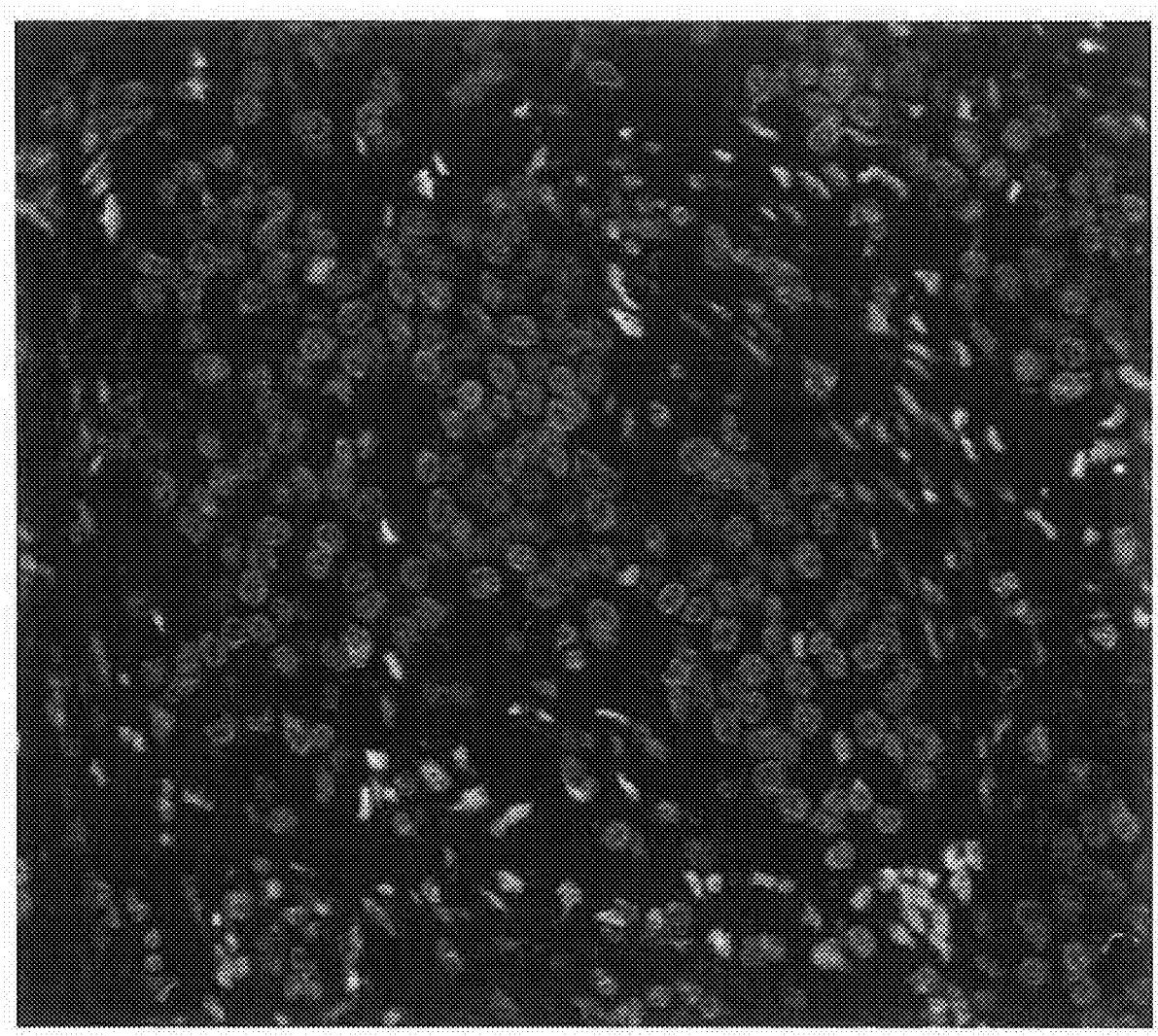
FIG. 7 shows an example of a modified Image $\hat{I}_2$ (modified image of $I_2$).

The modified image (206) is then created by dividing the original channel image $I_2$ (205) by the attenuation image (204). This attenuates all areas inside the masked regions of the channel image with smooth transitions over the edges. The modified image of $\hat{I}_s$ is shown in FIG. 7.

Figure 8:
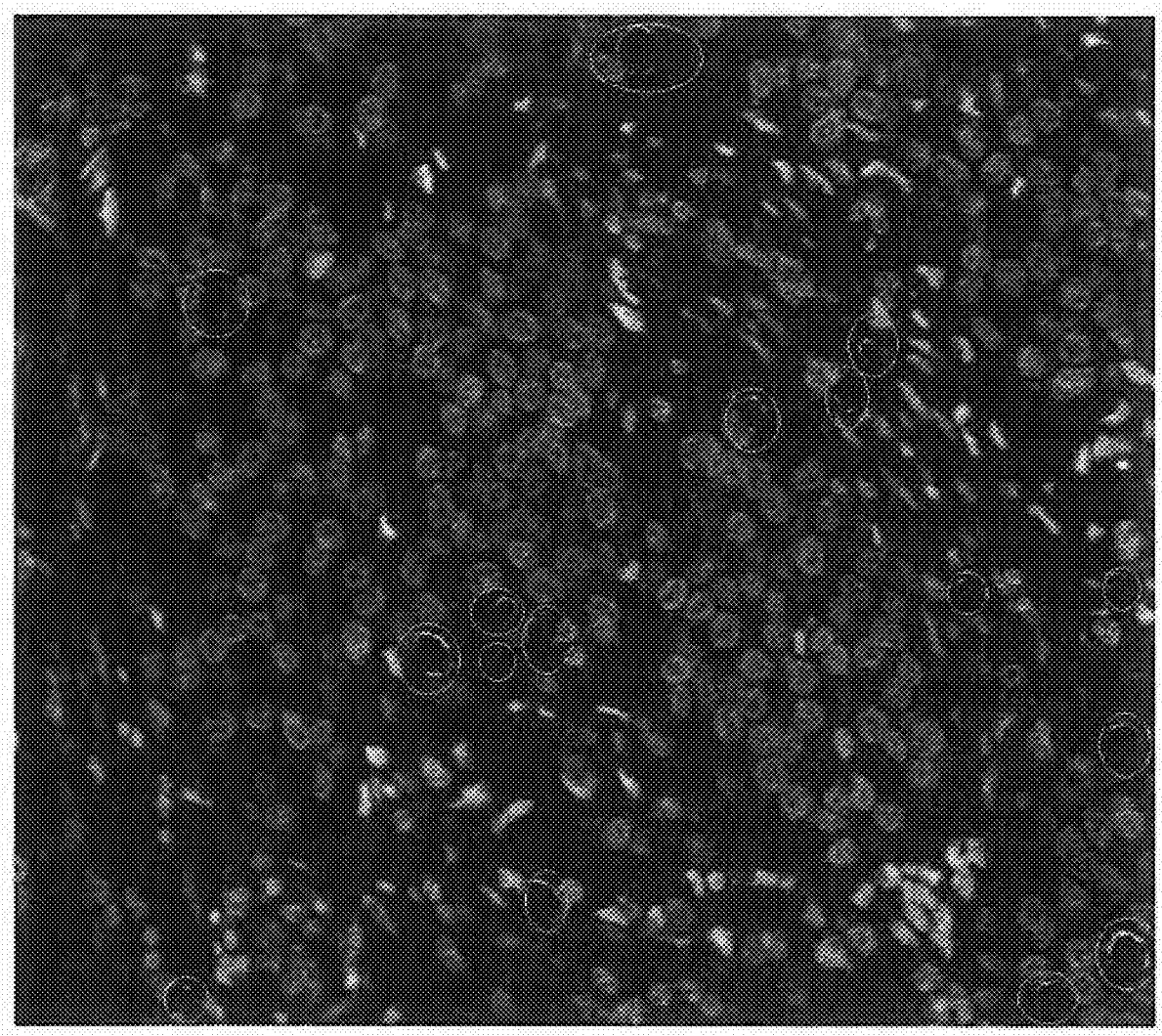
FIG. 8 shows a modified image of $I_2$ created by the conventional method for comparison.

For comparison, the modified image of $I_2$ created by the conventional process is shown in FIG. 8, where the artifacts are marked with red circles. In the conventional process the masked regions are simply subtracted out of the original channel image leaving sharp edge artifacts from the segmented areas.

Figure 9:
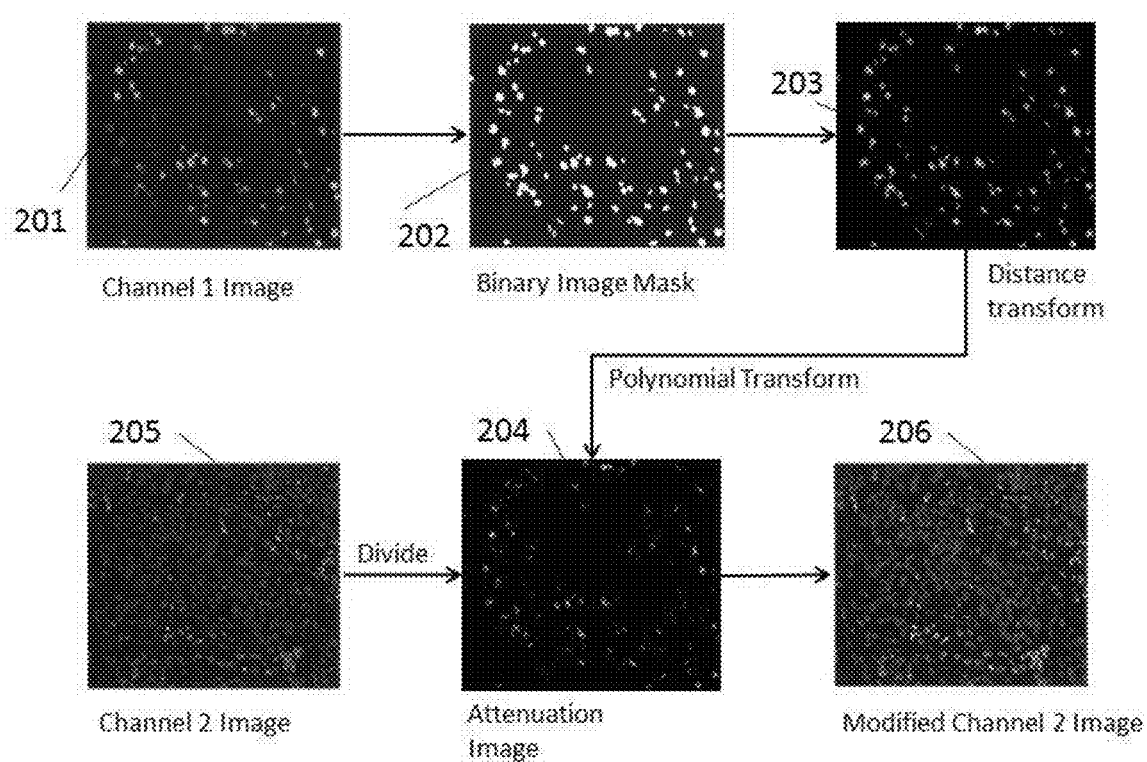
FIG. 9 shows an exemplary diagram of a process using the intermediate images.

As illustrated in FIG. 9, the method involves generating intermediate images at each stage. In the first step, the channel 1 image (201) is segmented. In the second step, the segmented channel 1 image is used to generate a binary image mask (202) and to dilate the binary image mask. In the third step, the binary image mask is converted into a distance transform (203). In the fourth step, the distance transform image is converted into an attenuation image (204). Finally, the channel 2 image (205) is divided by the attenuation image, to remove the segmented features from the channel 2 image. This results in a modified channel 2 image (206). The modified channel 2 image is them segmented to identify any features of interest in the channel 2 image that are not already present in the channel 1 image. This process is repeated until all channels have been modified and all features of interest in all channels have been segmented.

Obviously, the artifacts are almost invisible in the modified image created by the proposed method, which means cleaner image for further analysis and more accurate features for classification. Apart from appearance, the desired characteristics of transition between foreground and background can be controlled via the parameter of the polynomial transform, which can be further utilized during image analysis of the modified channel image. Note also that it is straight forward to parallel the components of the proposed algorithm since each pixel value of the attenuation image can be independent calculated from the distance transform image, which nicely fits into the single instruction-multiple data pattern (SIMD) required by existing parallel computing hardware architectures.

As shown in FIG. 10, the polynomial transform to convert from the distance transform image to the attenuation image may be any polynomial function. This transformation is performed on each pixel $D_r(x,y)$ in the image to produce an attenuation pixel $P_r(x,y)$, at each point, which makes up the attenuation image.

As shown in FIG. 1B, in some embodiments, a system (300) comprises an image acquisition system (301), which produces the multi-channel images. The image acquisition system is operatively connected to a memory (302), a processor (303), and a computer interface (304), wherein the memory is configured to store instructions that, when executed by a processor, cause the processor to perform the following operations: segmenting an image channel (305), creating a binary mask (306), computing a distance transform (307), computing an attenuation image (308), dividing a second image channel by the attenuation image of the first image channel (309), resulting in a modified second image channel, and repeating this process in sequence for all remaining image channels.

Additional Notes:

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

The computer may also take the form of a computer system having a processor coupled to a number of components directly, and/or using a bus. Such components can include main memory, static or non-volatile memory, and mass storage. Other components coupled to the processor can include an output device, such as a video display, an input device, such as a keyboard, and a cursor control device, such as a mouse. A network interface device to couple the processor and other components to a network can also be coupled to the bus. The instructions can further be transmitted or received over the network via the network interface device utilizing any one of a number of well-known transfer protocols (e.g., HTTP). Any of these elements coupled to the bus can be absent, present singly, or present in plural numbers, depending on the specific embodiment to be realized.

In an example, one or more of the processor, the memories, or the storage device can each include instructions that, when executed, can cause the machine to perform any one or more of the methods described herein. In alternative embodiments, the computer operates as a standalone device or can be connected (e.g., networked) to other machines. In a networked environment, the machine can operate in the capacity of a server or a client machine in server-client network environment, or as a peer machine in a peer-to-peer (or distributed) network environment. The computer can include a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

While the machine-readable medium is shown as a single medium, the term "machine-readable medium" should be taken to include a single medium or multiple media (e.g., a centralized or distributed database, or associated caches and servers, and or a variety of storage media, such as the processor registers, memories, and the storage device) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure, or that is capable of storing, encoding or carrying data structures utilized by or associated with such a set of instructions. The term "machine-readable medium" shall accordingly be taken to include, but not be limited to tangible media, such as solid-state memories, optical, and magnetic media.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), and magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an Internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the Internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Several modules are described in the specification and the claims. The modules may advantageously be configured to reside on an addressable storage medium and configured to execute on one or more processors. The modules may include, but are not limited to, software or hardware components that perform certain tasks. Thus, a module may include, for example, object-oriented software components, class components, processes methods, functions, attributes, procedures, subroutines, segments of program code, drivers, firmware, microcode, circuitry, data, databases, data structures, tables, arrays, and variables. Modules may be integrated into a smaller number of modules. One module may also be separated into multiple modules.

In describing representative embodiments of the subject disclosure, the specification may have presented the method and/or process of the present disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

The invention claimed is:

1. A method of performing segmentation on multi-channel images of a biological specimen, the method comprising:
    segmenting a first image channel of an image, wherein the segmentation creates segmented regions of the image;
    creating a first binary image mask of the first image channel based on a result of the segmentation from the first image channel;
    computing a first distance transform image, wherein each pixel in the first distance transform image that is inside a segmented region indicates a distance to a nearest edge of the segmented region;
    computing a first attenuation image, where the first attenuation image is a function of the distance transform image, applied to each pixel;
    attenuating a second image channel by dividing the second image channel by the first attenuation image, resulting in an attenuated second image channel; and
    segmenting the attenuated second image channel.

2. The method of claim 1, wherein each segmented region of the first binary image mask is dilated by a configurable number of pixels before computing the distance transform and the first attenuation image.

3. A method of performing segmentation on multi-channel images of a biological specimen, wherein the method is performed on a plurality of image channels that are sequentially arranged, the method comprising:

segmenting a first image channel of an image, wherein the segmentation creates segmented regions of the image; and for each segmented image channel in sequence, performing the following steps:
creating a binary image mask for the image channel,
computing a distance transform image from the binary image mask, wherein each pixel in the distance transform image that is inside a segmented region indicates a distance to a nearest edge of the segmented region,
computing an attenuation image, where the attenuation image is a function of the distance transform image applied to each pixel,
combining the attenuation images from all previous channels with the attenuation image of a current channel to create a combined attenuation image, and
attenuating the next image channel by dividing it by the combined attenuation image, resulting in an attenuated next image channel, and segmenting the attenuated next image channel.

4. The method of claim 3, wherein each segmented region of each binary image mask is dilated by a configurable number of pixels before computing the distance transform and the attenuation image.

5. A system for quality control of segmentation performed on multi-channel images of a biological specimen, the system comprising:

a processor; and a memory coupled to the processor, the memory stores instructions readable by a computing device that, when executed by the processor, cause the processor to perform operations comprising:
segmenting a first image channel of an image, wherein the segmentation creates segmented regions of the image,
creating a first binary image mask of the first image channel based on a result of the segmentation from the first image channel,
computing a first distance transform image, wherein each pixel in the first distance transform image that is inside a segmented region indicates a distance to a nearest edge of the segmented region,
computing a first attenuation image, where the first attenuation image is a function of the distance transform image, applied to each pixel,
attenuating a second image channel by dividing the second image channel by the first attenuation image, resulting in an attenuated second image channel, and segmenting the attenuated second image channel.

6. The system of claim 5, wherein each segmented region of the first binary image mask is dilated by a configurable number of pixels prior to computing the distance transform and the first attenuation image.

7. A system for quality control of segmentation performed on multi-channel images of a biological specimen, the system comprising:

a processor; and a memory coupled to the processor, the memory stores instructions readable by a computing device that, when executed by the processor, cause the processor to perform operations comprising:

segmenting a first image channel of an image, wherein the segmentation creates segmented regions of the image, for each segmented image channel in sequence, performing the following steps:
creating a binary image mask for the segmented image channel,
computing a distance transform image from the binary image mask, wherein each pixel in the distance transform image that is inside a segmented region indicates a distance to a nearest edge of the segmented region,
computing an attenuation image, where the attenuation image is a function of the distance transform image applied to each pixel,
combining the attenuation images from all previous channels with the attenuation image of a current channel to create a combined attenuation image,
attenuating the next image channel by dividing it by the combined attenuation image, resulting in an attenuated next image channel, and
segmenting the attenuated next image channel.

8. The system of claim 7, wherein each segmented region of each binary image mask is dilated by a configurable number of pixels before computing the distance transform and the attenuation image.

9. A tangible non-transitory computer-readable storage medium to store digitally encoded instructions for performing segmentation on multi-channel images of a biological specimen, wherein the digitally encoded instructions, when executed by a processor, cause the processor to perform operations comprising:

segmenting a first image channel of an image, wherein the segmentation creates segmented regions of the image;
creating a first binary image mask of the first image channel based on a result of the segmentation from the first image channel;
computing a first distance transform image, wherein each pixel in the first distance transform image that is inside a segmented region indicates a distance to a nearest edge of the segmented region;
computing a first attenuation image, where the first attenuation image is a function of the distance transform image, applied to each pixel;
attenuating a second image channel by dividing the second image channel by the first attenuation image, resulting in an attenuated second image channel; and
segmenting the attenuated second image channel.

10. The storage medium of claim 9, wherein each segmented region of the first binary image mask is dilated by a configurable number of pixels prior to computing the distance transform and the first attenuation image.

11. A tangible non-transitory computer-readable storage medium to store digitally encoded instructions for performing segmentation on multi-channel images of a biological specimen, wherein the digitally encoded instructions, when executed by a processor, cause the processor to perform operations comprising:

segmenting a first image channel of an image, wherein the segmentation creates segmented regions of the image; and for each segmented image channel in sequence, performing the following steps:
creating a binary image mask for the segmented image channel,
computing a distance transform image from the binary image mask, wherein each pixel in the distance transform image that is inside a segmented region indicates a distance to a nearest edge of the segmented region, computing an attenuation image, where the attenuation image is a function of the distance transform image applied to each pixel, combining the attenuation images from all previous channels with the attenuation image of a current channel to create a combined attenuation image, attenuating the next image channel by dividing it by the combined attenuation image, resulting in an attenuated next image channel, and segmenting the attenuated next image channel.

12. The storage medium of claim 11, wherein each segmented region of each binary image mask is dilated by a configurable number of pixels before computing the distance transform and the attenuation image.

* * * * *